United States Patent [19]

Lieder

[11] 4,330,522

[45] May 18, 1982

[54] ACID GAS SEPARATION

[75] Inventor: Charles A. Lieder, Houston, Tex.

[73] Assignee: Shell Oil Company, Houston, Tex.

[21] Appl. No.: 218,604

[22] Filed: Dec. 22, 1980

[51] Int. Cl.$^3$ .................... C01B 17/05; B01D 53/34
[52] U.S. Cl. ........................ 423/573 G; 423/224; 423/226; 55/68; 55/73
[58] Field of Search ............... 423/224, 226, 571, 573; 55/68, 73

[56] References Cited

U.S. PATENT DOCUMENTS

| | | | |
|---|---|---|---|
| 3,068,065 | 12/1962 | Hartley et al. | 423/228 |
| 3,580,950 | 5/1971 | Bersworth | 560/169 |
| 3,590,555 | 7/1971 | Wackernagel | 55/73 X |
| 4,091,073 | 5/1978 | Winkler | 423/226 |

FOREIGN PATENT DOCUMENTS 999799  7/1965  United Kingdom ............ 423/573 L

*Primary Examiner*—Earl C. Thomas

[57] ABSTRACT

Acid gases are separated from gaseous streams by the use of absorbents having the formula

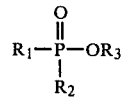

wherein $R_1$, $R_2$, and $R_3$ are alkyl containing 1 through 4 carbon atoms.

17 Claims, No Drawings

ACID GAS SEPARATION

BACKGROUND OF THE INVENTION

This invention relates to the separation of acid gases from gaseous mixtures. More particularly, this invention relates to the separation of acid gases, particularly $CO_2$, from gas mixtures, the separation being characterized by the use of a selective absorbent.

A number of methods have been proposed previously for the purification of mixtures of industrial gases, such as hydrocarbon gases contaminated with hydrogen sulfide, carbonyl sulfide, carbon dioxide, and the like. Some of these methods involve the formation of salts of the acid gases, the salts being subsequently decomposed, usually by heating, to regenerate the solution utilized as an absorbent and to drive off the gas absorbed.

In many cases, aqueous solutions of alkanolamines and like materials are utilized. Such solutions have relatively limited solubility for $CO_2$. This factor requires the recycling and treating of unduly large quantities of such solutions, as well as resulting in the utilization of unduly large amounts of heat to regenerate such solutions. Additionally, one of the most important disadvantages of the use of such solutions is the limited solubility for the acid gases when the latter are under a high partial pressure. Accordingly, only fractional removal of the acid gas from its admixture with hydrocarbons or other gaseous materials is obtained.

Contrasted to the use of so-called "chemical solvents" (involving the formation of salts or other decomposable reaction products), certain classes of materials are regarded as "physical solvents". These latter materials appear to act in a purely physical manner, absorbing acidic gases physically without the formation of any apparent reaction product. For example, mixtures of glycols with amines are known, particularly for the treatment of liquid hydrocarbon products for the removal of mercaptans, $H_2S$ and other acidic substances. However, glycols have not been found to be very efficient due to the limited solubility of the acid gases therein. Aqueous dispersions of glycols are no better in this respect, and may exhibit extreme corrosiveness toward processing equipment.

SUMMARY OF THE INVENTION

Accordingly, the invention, in one embodiment, comprises a process for the removal of an acid gas or gases, such as $CO_2$ and $H_2S$, from sour gases or gaseous streams, e.g., hydrocarbon containing streams, by the selective absorption of the acid gas or gases from the stream utilizing a novel absorption solvent. In this embodiment, the invention relates to a process for the removal of an acid gas from a sour gas stream comprising contacting the sour gas stream with an absorbent solution comprising a compound having the formula $$R_1-\underset{\underset{R_2}{|}}{\overset{\overset{O}{\|}}{P}}-OR_3$$

wherein $R_1$, $R_2$, and $R_3$, may be the same or different, and are alkyl containing 1 through 4 carbon atoms. Preferably $R_1$, $R_2$, and $R_3$ are alkyl containing 2 through 4 carbon atoms and $R_1$, $R_2$, and $R_3$ are the same or are different. After absorption of the acid material, the "loaded" solution is removed from the absorption zone, and the acid gas or gases are stripped from the loaded absorbent, the "lean" solvent being returned for reuse. The stripped acid gases may be treated, as desired.

In another embodiment, the invention comprises a process for the separation of $CO_2$ and $H_2S$ from a gaseous stream, the process being characterized by the use of the novel absorption solvent, described, supra, the absorbent also containing a reactant for converting the $H_2S$ to sulfur. In this embodiment, the sour gas is contacted preferably with a solvent-reactant system which comprises a regenerable reactant, free sulfur being recovered prior to subsequent to regeneration. Suitable reactant materials include polyvalent metallic ions, such as iron, vanadium copper, manganese, and nickel, and include polyvalent metal chelates. As used herein, unless otherwise inconsistent with the intent expressed, the term "mixtures thereof", in referring to the reactant materials indicated, includes mixtures of the polyvalent metal ions, mixtures of the polyvalent metal chelates, and mixtures of polyvalent metal ions and polyvalent metal chelates. Preferred reactants are coordination complexes in which polyvalent metals form chelates with an acid having the formula $$(X)_{3-n}-N-(Y)_n$$

wherein n is a whole number from 1 to 3; Y is an acetic acid or propionic acid group; X is 2-hydroxy ethyl, 2-hydroxy propyl, or an alkyl group having from one to four carbon atoms; or

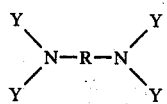

wherein:
from two to four of the groups Y are selected from acetic and propionic acid groups;
from zero to two of the groups Y are selected from 2-hydroxy ethyl, 2-hydroxy propyl, and

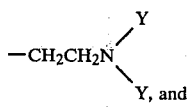

R is ethylene, propylene or isopropylene or alternatively cyclohexane or benzene where the two hydrogen atoms replaced by nitrogen are in the 1,2 position, and mixtures of such complexes.

Any polyvalent metal can be used, but iron, copper and manganese are preferred, particularly iron. The polyvalent metal should be capable of oxidizing hydrogen sulfide, while being reduced itself from a higher to a lower valence state, and should then be oxidizable by oxygen from the lower valence state to the higher valence state in a typical redox reaction. Other polyvalent metals which can be used include lead, mercury, palladium, platinum, tungsten, nickel, chromium, cobalt, vanadium, titanium, tantalum, zirconium, molybdenum, and tin.

The polyvalent metal chelates are readily formed in aqueous solution by reaction of an appropriate salt, oxide or hydroxide of the polyvalent metal and the chelating agent in the acid form or an alkali metal or ammonium salt thereof. Exemplary chelating agents include amino acetic acids derived from ammonia or 2-hydroxy alkyl amines, such as glycine, diglycine (imino diacetic acid), NTA nitrilo-triacetic acid), 2-hydroxy alkyl glycine; di-hydroxyalkyl glycine, and hydroxyethyl or hydroxypropyl diglycine; amino acetic acids derived from ethylene diamine, diethylene triamine, 1,2-propylene diamine, and 1,3-propylene diamine, such as EDTA (ethylene diamine tetraacetic acid), HEDTA (2-hydroxy ethylethylene diamine triacetic acid), DETPA (diethylene triamine pentaacetic acid); amino acetic acid derivatives of cyclic 1,2-diamines, such as 1,2-diamino cyclohexane-N,N-tetraacetic acid, and 1,2-phenylenediamine-N,N-tetraacetic acid, and the amides of polyamino acetic acids disclosed in Bersworth U.S. Pat. No. 3,580,950.

The particular type of gaseous stream treated is not critical, regardless of which embodiment of the invention is employed, as will be evident to those skilled in the art. Streams particularly suited to removal of $CO_2$, and $H_2S$, by the practice of the invention, are, as indicated, naturally occurring gases, synthesis gases, process gases, and fuel gases produced by gasification procedures, e.g., gases produced by the gasification of coal, petroleum, shale, tar sands, etc. Particularly preferred are coal gasification streams, natural gas streams and refinery feedstocks composed of gaseous hydrocarbon streams, especially those streams of this type having a low ratio of $H_2S$ and $CO_2$, and other gaseous hydrocarbon streams. The term "hydrocarbon streams", as employed herein, is intended to include streams containing significant quantities of hydrocarbon (both paraffinic and aromatic), it being recognized that such streams contain significant "impurities" not technically defined as a hydrocarbon. Again, streams containing principally a single hydrocarbon, e.g., ethane, are eminently suited to the practice of the invention. Streams derived from the gasification and/or partial oxidation of gaseous or liquid hydrocarbon may be treated by the invention. The $H_2S$ content of the type of streams contemplated will vary extensively, but, in general, will range from about 0.1 percent to about 5 percent by volume. $CO_2$ content may also vary, but preferably will range from about 0.5 percent to about 50.0 percent by volume. Obviously, the amount of $H_2S$ and $CO_2$ present is not generally a limiting factor in the practice of the invention.

Where the acid gas or gases are simply absorbed from the sour gas stream, a cyclic regeneration procedure is preferred. Thus, the loaded absorbent is removed from the contact zone, is stripped, preferably by heating to produce a lean absorbent, the lean absorbent is then cooled, and the lean absorbent is returned to the contact zone.

If a reactant-containing absorbent solution is employed, the loaded absorbent mixture is removed from the contacting zone and regenerated in a regeneration zone or zones. If significant quantities of $CO_2$ have been absorbed, the reactant-containing solution is preferably treated, such as by heating or pressure reduction, to remove the bulk of the $CO_2$ before regeneration of the reactant (either prior or subsequent to sulfur removal). Alternately, of if small quantities of $CO_2$ are absorbed, the $CO_2$ may simply be stripped in the regeneration zone.

The reactant is regenerated by stripping with oxygen. As used herein, the term oxygen includes oxygen-containing gases, such as air. The oxygen stripping accomplishes two functions, the oxidation of the reactant to its higher valence state and the stripping of any residual $CO_2$ (if originally present) from the absorbent mixture. The oxygen (in whatever form supplied) is supplied in a stoichiometric equivalent or excess with respect to the amount of metal ion or chelate present in the mixture. Preferably, the oxygen is supplied in an amount of from about 1.2 to 3 times excess.

The temperatures employed in the absorption zone are not generally critical, except in the sense that the temperatures employed must permit acceptable absorption of the acid gas or gases. A relatively wide range of temperatures, e.g., from 0° to 40° or even 50° C. may be utilized, although a range of from about 0° to about 30° C. is preferred. In many commercial applications, such as the removal of $H_2S$ and $CO_2$ from natural gas to meet pipeline specifications, absorption at ambient temperatures is preferred, since the cost of refrigeration would exceed the benefits obtained due to increased absorption at the lower temperature. Contact times will range from about 1 second to about 120 seconds, with contact times of 2 seconds to 60 seconds being preferred.

Similarly, in the regeneration or stripping zone or zones, temperatures may be varied widely. Preferably, the regeneration zone should be maintained as close as possible to the same temperature as the absorption zone. If heat is added to strip or assist regeneration, cooling of the absorbent mixture is required before return of the absorbent mixture to the absorption zone. In general, temperatures of from about 0° to 110° C., preferably 0° to 90° C. may be employed.

Pressure conditions in the absorption zone may vary widely, depending on the pressure of the gas to be treated. For example, pressures in the absorption zone may vary from one atmosphere up to one hundred fifty or even two hundred atmospheres. Pressures of from one atmosphere to about one hundred atmospheres are preferred. In the regeneration or desorption zone or zones, pressures will range from about one atmosphere to about three or four atmospheres. The pressure-temperature relationships involved are well understood by those skilled in the art, and need not be detailed herein. The procedure may be conducted either batch-wise or continuously.

Where a reactant is employed to enhance removal of $H_2S$ from a sour gas stream, the $H_2S$ is preferably converted to elemental sulfur. Where a polyvalent metal chelate is employed as a reactant, the chelate is preferably supplied in admixture with the liquid absorbent and water. The reactant compound, chelate, or mixture thereof is supplied in an effective amount i.e., an amount sufficient to convert all or substantially all of the $H_2S$ in the gas stream, and will generally be on the order of at least about two mols (basis polyvalent metal) per mol of $H_2S$. Ratios of from about 2 mols to about 15 mols of compound or chelate per mol of $H_2S$ may be used, with ratios of from about 2 mols per mol to about 5 mols of chelate per mol of $H_2S$ being preferred. The manner of preparing the admixture is a matter of choice. For example, the chelate may be added to the absorbent, and, if necessary, then water added. The amount of water added will normally be just that amount necessary to achieve solution of the chelate, and can be determined by routine experimentation. Since the chelate may have a significant solubility in the solvent, and since water is produced by the reaction of the $H_2S$ and the chelate, precise amounts of water to be added cannot be given.

Approximately 5 percent to 10 percent water by volume, based on the total volume of the absorbent mixture, will generally provide solvency. Preferably, however, the chelate is added as an aqueous solution to the liquid absorbent. Where the chelate is supplied as an aqueous solution, the amount of chelate solution supplied may be about 20 percent to about 80 percent by volume of the total absorbent admixture supplied to the absorption zone. The chelate solution will generally be supplied as an aqueous solution having a concentration of from about 2 molar to about 3 molar. A concentration of about 2 molar is preferred. Conditions of operation for this type of reaction process are further described in U.S. Pat. No. 3,068,065 to Hartley, et al, dated Dec. 11, 1962, and Great Britain patent specification No. 999,799 to Nichol et al, published July 28, 1965, which disclosures are incorporated herein by reference.

In order to demonstrate the invention, the following experiments were run.

EXAMPLE I

A stream of carbon dioxide was bubbled through 50 milliliters of ethyl diethyl phosphonate at 200 PSIG for approximately 37 minutes and equilibrium was reached. Approximately 9.6 milliliters of loaded absorbent was withdrawn and the released gas was captured in an inverted graduate. $CO_2$ released measured 595 milliliters, thus demonstrating the excellent absorbency of ethyl diethyl phosphonate for $CO_2$. (Volume $CO_2$/Volume of solution $= 63.2$).

EXAMPLE II

The procedure of Example I was followed, at a pressure of 100 PSIG, and approximately 26 milliters of absorbent was withdrawn. Six hundred and ninety one milliliters of $CO_2$ were recovered. (Volume $CO_2$/Volume solution $= 27.2$).

EXAMPLE III

Hydrogen sulfide was bubbled through 60 milliliters of ethyl diethyl phosphonate at room temperature. The results are shown in the table below:

TABLE

| Time | PSIG | Liquid Temp. °C. | Vapor Temp. °C. | Sample wgt $\approx$ vol (ml) | H$_2$S desorbed vol (ml) |
|------|------|------------------|-----------------|-------------------------------|--------------------------|
| 0945 | 0    | 29               | 26              |                               |                          |
| 1045 | 200  | 25               | 21              |                               |                          |
|      |      | ...then sample removed → |       | 6.2                           | 1500                     |
|      |      |                  |                 | $V_{H_2S}/V_{solution} = 242$. |                          |
| 1050 | 100  | 30               | 27              |                               |                          |
| 1120 | 100  | 31               | 29              |                               |                          |
|      |      | ...then sample removed → |       | 8.0                           | 1005.                    |
|      |      |                  |                 | $V_{H_2S}/V_{solution} = 126$. |                          |
| 1130 | 50   | 30               | 29              |                               |                          |
| 1212 | 50   | 33               | 31              |                               |                          |
|      |      | ...then sample removed → |       | 19                            | 1000                     |
|      |      |                  |                 | $V_{H_2S}/V_{solution} = 53$.  |                          |

Selectivity for H$_2$S/CO$_2$ absorption (at 30° C.) calculated from these data would be 3.8 (for 200 psig, pure component) and 4.7 (for 100 psig pure component).

What is claimed is:

1. A process for the absorption of an acid gas selected from H$_2$S, CO$_2$, and mixtures thereof from a sour gas stream comprising contacting the sour gas stream in an absorption zone under absorption conditions with a liquid absorbent having the formula

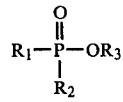

wherein R$_1$, R$_2$, and R$_3$ may be the same or different, and are alkyl containing 1 through 4 carbon atoms.

2. The process of claim 1 wherein liquid absorbent, after contacting the sour gas stream, is removed from the absorption zone, is stripped to produce a gas stream containing said acid gas or gases, and is then returned to the absorption zone.

3. The process of claim 1 wherein liquid absorbent, after contacting the sour gas stream, is removed from the absorption zone, is heated to produce a gas stream containing said acid gas or gases, is then cooled, and is then returned to the absorption zone.

4. A process for the removal of H$_2$S and CO$_2$ from a sour gaseous stream comprising:
   (a) contacting the sour gaseous stream in a contacting zone with an absorbent mixture comprising an liquid absorbent having the formula

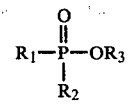

wherein R$_1$, R$_2$, and R$_3$ may be the same or different, and are alkyl containing 1 through 4 carbon atoms, and an effective amount of a reactant selected from polyvalent metallic ions and polyvalent metal chelate compounds, and mixtures thereof, to produce a sweet gas stream and an absorbent admixture containing absorbed CO$_2$, sulfur, and a reduced reactant;
   (b) removing at least a portion of the sulfur from the absorbent admixture;
   (c) stripping the absorbent admixture in a stripping zone with oxygen to produce CO$_2$ and a regenerated reactant;
   (d) returning the absorbent admixture from the stripping zone to the contacting zone of step A.

5. A process for the removal of H$_2$S and CO$_2$ from a sour gaseous stream comprising:
   (a) contacting the sour gaseous stream in a contacting zone with an absorbent mixture comprising an liquid absorbent having the formula

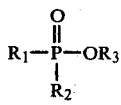

wherein $R_1$, $R_2$, and $R_3$ may be the same or different, and are alkyl containing 1 through 4 carbon atoms, and an effective amount of a reactant selected from polyvalent metallic ions and polyvalent metal chelate compounds, and mixtures thereof, to produce a sweet gas stream and an absorbent admixture containing absorbed $CO_2$, sulfur, and a reduced reactant;
(b) stripping the absorbent admixture in a stripping zone with oxygen to produce $CO_2$ and a regenerated reactant;
(c) removing at least a portion of the sulfur from the admixture;
(d) returning the absorbent admixture to the contacting zone of step A.

6. A process for the removal of $H_2S$ and $CO_2$ from a sour gaseous stream comprising:
(a) contacting the sour gaseous stream in a contacting zone with an absorbent mixture comprising an liquid absorbent having the formula

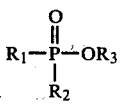

wherein $R_1$, $R_2$, and $R_3$ may be the same or different, and are alkyl containing 1 through 4 carbon atoms, and an effective amount of a reactant selected from polyvalent metallic ions and polyvalent metal chelate compounds, and mixtures thereof, to produce a sweet gas stream and an absorbent admixture containing absorbed $CO_2$, sulfur, and a reduced reactant;
(b) removing $CO_2$ from the absorbent admixture;
(c) removing at least a portion of the sulfur from the absorbent admixture;
(d) stripping the absorbent admixture in a stripping zone with oxygen to produce a regenerated reactant;
(e) returning the absorbent admixture from the stripping zone to the contacting zone of step A.

7. A process for the removal of $H_2S$ and $CO_2$ from a sour gaseous stream comprising:
(a) contacting the sour gaseous stream in a contacting zone with an absorbent mixture comprising an liquid absorbent having the formula

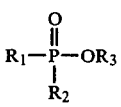

wherein $R_1$, $R_2$, and $R_3$ may be the same or different, and are alkyl containing 1 through 4 carbon atoms, and an effective amount of a reactant selected from polyvalent metallic ions and polyvalent metal chelate compounds, and mixtures thereof, to produce a sweet gas stream and an absorbent admixture containing absorbed $CO_2$, sulfur, and a reduced reactant;
(b) removing at least a portion of the sulfur from the absorbent admixture;
(c) removing $CO_2$ from the absorbent admixture;
(d) stripping the absorbent admixture in a stripping zone with oxygen to produce a regenerated reactant;
(e) returning the absorbent admixture from the stripping zone to the contacting zone of step A.

8. A process for the removal of $H_2S$ and $CO_2$ from a sour gaseous stream comprising:
(a) contacting the sour gaseous stream in a contacting zone with an absorbent mixture comprising an liquid absorbent having the formula

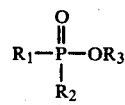

wherein $R_1$, $R_2$, and $R_3$ may be the same or different, and are alkyl containing 1 through 4 carbon atoms, and an effective amount of a reactant selected from polyvalent metallic ions and polyvalent metal chelate compounds, and mixtures thereof, to produce a sweet gas stream and an absorbent admixture containing absorbed $CO_2$, sulfur, and a reduced reactant;
(b) removing $CO_2$ from the absorbent admixture;
(c) stripping the absorbent admixture in a stripping zone with oxygen to produce $CO_2$ and a regenerated reactant;
(d) removing at least a portion of the sulfur from the admixture;
(e) returning the absorbent admixture to the contacting zone of step A.

9. The process of claim 2 wherein $R_1$, $R_2$, and $R_3$ are ethyl.

10. The process of claim 3 wherein $R_1$, $R_2$, and $R_3$ are ethyl.

11. The process of claim 4 wherein $R_1$, $R_2$, and $R_3$ are ethyl.

12. The process of claim 5 wherein $R_1$, $R_2$, and $R_3$ are ethyl.

13. The process of claim 6 wherein $R_1$, $R_2$, and $R_3$ are ethyl.

14. The process of claim 7 wherein $R_1$, $R_2$, and $R_3$ are ethyl.

15. The process of claim 8 wherein $R_1$, $R_2$, and $R_3$ are ethyl.

16. The process of claim 11 wherein the polyvalent metal chelate compound is the iron chelate of nitrilotriacetic acid.

17. The process of claim 12 wherein the polyvalent metal chelate compound is the iron chelate of nitrilotriacetic acid.

* * * * *